United States Patent Office

3,356,765
Patented Dec. 5, 1967

3,356,765
ISOTACTIC POLYPROPYLENE SHEETS CONTAINING ISOTACTIC POLY-1-BUTENE
Pompilio Musso and Giuseppe Guzzetta, Milan, Italy, assignors to Montecatini Edison S.p.A., Milan, Italy, a corporation of Italy
No Drawing. Filed Sept. 20, 1963, Ser. No. 310,498
Claims priority, application Italy, Oct. 11, 1956, 14,865/56
2 Claims. (Cl. 260—897)

ABSTRACT OF THE DISCLOSURE

Thermoplastic sheet prepared from a blend of polypropylene comprising at least 75% of linear, regular isotactic-crystalline macromolecules and poly-1-butene comprising at least 75% of linear, regular isotactic-crystalline macromolecules. Sheet is resistant to temperatures ranging up to about 110° C. and higher, and has a high mechanical strength and an elastic modulus ranging from about 7,000 to 15,000 kg./cm.$^2$.

*Cross-reference to related application*

This application is a continuation-in-part of patent application Serial No. 686,036, filed on September 29, 1957, now abandoned.

This invention relates to thermoplastic non-fibrous sheets and foils having exceptional physical and mechanical characteristics. More particularly, the invention relates to sheets and foils comprising isotactic polypropylene. Thermoplastic sheets of different kinds of resins, including sheets made from vinyl chloride polymers and copolymers, styrene polymers and copolymers, polymethylmethacrylate, polyethylene, etc., are known and can be used for various industrial purposes.

However, all of the synthetic resin sheets which have been available heretofore have limitations of one kind or another. Sheets of the vinyl chloride polymers, for example, cannot be made by convenient, economical methods, e.g. extrusion methods, but require complicated apparatus for their production which involves relatively high processing costs. Sheets of polyethylene, on the other hand, are not sufficiently stiff for many uses. Other types of sheets do not have good heat-resistance or are deficient in resistance to chemicals and are therefore damaged by corrosive materials, etc. A general drawback of all of the presently available synthetic resin sheets, and foils, is the extent to which the mechanical properties of the sheets are decreased by an increase in the temperature to which the sheets are exposed. These sheets cannot be used, for example, under conditions of exposure to temperatures above 60° C., even when the stresses to which the sheets are subjected are low, without a resulting softening and a marked reduction in strength.

Accordingly, it is an object of this invention to provide new synthetic resin sheets which are superior to the sheets known heretofore.

It is another object of this invention to provide new thermoplastic sheets which do not lose their high-mechanical strength at temperatures up to about 110° C. and higher.

Recently, Natta et al. have discovered polymerizates of alpha-olefins having the formula $CH_2\!=\!CHR$, wherein R is a hydrocarbon radical of one or more carbon atoms. (See the papers entitled "The crystalline structure of a new type of polypropylene" and "A new class of alpha-olefins polymers having exceptional uniformity of structure." These papers are presented by Natta et al. on December 11, 1954, to an open meeting of the Accademia Nazionale Dei Lincei and published in the Proceedings of the Accademia on January 29, 1955.) These polymerizates of alpha-olefins comprise distinct and separable macromolecules having two different steric configurations. Some of said macromolecules are crystalline at ordinary temperatures while other of said macromolecules are amorphous or non-crystalline. The crystalline macromolecules are linear, head-to-tail macromolecules wherein substantially all of the asymmetric tertiary main-chain carbon atoms of adjacent monomeric units comprising a given section of the chain have the same steric configuration. The main chains of the macromolecules, if fully extended in a hypothetical plane, have substantially all of the R groups bound to the tertiary carbon atom of the successive monomeric units on one side of the plane and all of the hydrogen atoms bound to said tertiary carbon atoms on the opposite side. These polymers were termed "isotactic" by Natta et al.

The amorphous or non-crystalline ploymerizates are linear, head-to-tail macromolecules wherein the main-chains of said macromolecules, if fully extended in a hypothetical plane, would have the R groups and the hydrogen atoms bound to the tertiary carbon atom in a substantially random distribution on both sides of the plane. These amorphous macromolecules were termed "atactic" linear polymers. A further description of the Natta et al. polymerizates can be found in U.S. Patent No. 2,882,263.

It has been shown that macromolecules having different steric structures occur together in the crude polymerizate which is obtained by polymerizing an alpha-olefin in the presence of a specific catalyst. The catalyst can be prepared, for example, from a halide of a transition metal selected from groups IV to VI of the Periodic Table and an organic metallic compound of a metal selected from groups I–III of Mendeleeff's Periodic Table. The polymers having sterically different configurations can be separated, however, by using selective solvents. It has been shown by Natta et al. that if specific catalysts of the general class mentioned are used in the polymerization of the alpha-olefins, it is possible to orient the reaction so that the polymerizate obtained consists prevailingly of isotactic macromolecules or prevailingly of atactic macromolecules.

The sheets of this invention comprise a propylene polymerizate consisting prevailingly of isotactic polypropylene and more preferably a mixture or blend of the propylene polymerizate with a butene-1 polymerizate which consist prevailingly of isotactic polybutene-1. In the polymerizates of polypropylene and polybutene-1, the proportion of atactic macromolecules does not exceed 25%. In other words, the isotactic macromolecules constitute at least 75% of the polymerizates. Thus, it has been discovered, quite unexpectedly, that from polypropylene/polybutene-1 blends there can be obtained sheets which exhibit exceptionally outstanding physical and chemical characteristics such as, for example, varying degrees of stiffness, by varying the relative proportions of the blend. The sheets of this invention can be obtained by simple, economic methods and are characterized by having a high elastic modulus, which ranges from about 7000 to 15,000 kg./cm.$^2$. More important, these sheets are not weakened or damaged when exposed to temperatures ranging up to 110° C. Moreover, these sheets have unusual chemical and mechanical resistance and are more easily worked. The heat-resistance of these sheets is of great importance and a desirable property which distinguishes them over other synthetic resin sheets.

Since the temperature to which the sheets of this invention can be safely exposed is about 50° C. higher than the temperature for other sheets, it is evident that it is possible to extend these thermoplastic sheets to a variety of uses not heretofore possible. The sheets of this invention can be produced by any of the known methods, using conventional sheet-forming apparatus. For example, the sheets may be obtained by a melt-extrusion of the isotactic polypropylene or blend thereof with isotactic polybutene-1 through an extruder provided with a flat-slit head, by hot-calendering, or by molding the sheets in a press having two or more planes, followed by cooling.

The particular operating conditions, such as the temperature at which the sheets are formed, vary depending on the particular polymer blend within the above-mentioned ranges and the molecular weights of the particular propylene and butene-1 polymers employed therein. As an example, if the molecular weight of the polymer ranges between about 80,000 to 200,000, then the polymer is preferably extruded, calendered, press-molded, etc. at a temperature ranging from 190° C. to 250° C.

Likewise, the cooling conditions must be selected in view of other factors such as the thickness of the sheet. If the sheet is thin, that is if the thickness does not exceed 1.5 mm., rapid cooling of the sheet gives the best results, whereas for sheets having a thickness above 1.5 mm., it is preferred to cool the sheet gradually, in order to inhibit internal strains which could unfavorably influence the behavior of the sheets in subsequent treatments and in use. Should such internal strains develop, however, they can be relieved, and the sheet conditioned, by heating the sheet for a few minutes at a temperature ranging from about 5° C. to 10° C. below the transition temperature of the polymer.

The mass to be formed into sheets which comprises isotactic polypropylene and preferably a blend thereof with isotactic polybutene-1 can be modified by incorporating therein various adjuvants, such as dyes, pigments, antioxidants, and other inert materials, without appreciably effecting the inherent heat-resistance properties of the product.

The following examples are given to illustrate specific embodiments of the invention. In the examples, parts are by weight unless otherwise specified.

EXAMPLE 1

Using a roll mixer at 240° C. for 15 minutes, 0.5 part of an antioxidant, 1.0 part of titanium dioxide, and 0.2 part of phthalocyanine green were thoroughly mixed with a blend of 85 parts of isotactic polypropylene having a molecular weight of 160,000 with 15 parts of isotactic polybutene-1 having a molecular weight of 130,000. Sheets having a thickness of 3 mm. were obtained. The sheets were placed between two chromium plated steel plates and the assembly was inserted between the plates of a press heated to 250° C. The sheets were heated for about 10 minutes and then pressed at 120 kg./cm.² for 5 minutes. Sheets thus obtained were cooled under pressure to a temperature of 100° C., and then removed from the mold. The sheets thus obtained are useful as coverings under various conditions, for constructing parts of chemical apparatus, and for other purposes, and can be drawn or formed under vacuum, etc.

EXAMPLE 2

Isotactic polypropylene having a molecular weight of 110,000 and having 1% of an antioxidant and 2% of rutile titanium dioxide pigment mixed therewith, was extruded at 210–220° C. using a screw extruder having a head provided with a flat slit 1100 mm. wide with an opening 2.3 mm. wide. The sheet emerging from the slit was collected on a drum having a chromium plated surface and maintained at 40° C. The sheet was pressed against the surface of the drum by means of three chromium plated rolls. The drum and pressure rolls were rotated at a speed to maintain the sheet under a tension and stretch it 15% in the direction of extrusion. As the sheet was removed from the drum it passed between two knives supported on either side of the drum and which sheared off 50 mm. from the edges of the sheet. The white sheet, 2 mm. thick and 1000 mm. wide, could be used for a variety of applications.

For example, when sheets obtained in this manner are heated by means of infra-red heat, to a temperature of about 160° C., they can be shaped, in the heat-softened state, and in the usual apparatus under vacuum to obtain containers of different sizes and shapes, parts of electrical devices, and various articles for household use. On cooling, the shaped sheets are set in the shaped condition.

EXAMPLE 3

Using the same apparatus as in Example 2, a laminate was made by extruding a sheet of polyethylene having a molecular weight of 80,000 (obtained by low pressure polymerization of ethylene) at 190° C. A film of isotactic polypropylene, 0.02 mm. thick and 1050 mm. wide, unwinding from a roll above a cooling drum, was contacted with the extruded polyethylene sheet on the first pressure roll and pressed onto the polyethylene sheet. The resulting composite sheet had a very brilliant surface, was dimensionally stable and resistant to scratching, chemicals, and to damage at temperatures up to 110° C. The composite sheets can be used for a number of different purposes and can be shaped under vacuum.

When blends of isotactic polypropylene and isotactic polybutene-1 were used, in forming the sheets, the polybutene-1 was present in an amount ranging from about 5% to 40% based on the blend weight. Sheets obtained from blends containing 5% to 40% of the isotactic polybutene-1 were noted to have high tenacity, good mechanical strength and a high elastic modulus. Moreover, sheets obtained from different blends were capable of having different degrees of stiffness depending on the relative proportions of the blend. These sheets, in comparison to the isotactic polypropylene sheets, have a reduced brittle-point, which is an important advantage for some specific uses. The isotactic polypropylene and isotactic polybutene-1 used in preparing the sheets may have molecular weights ranging from about 80,000 to 200,000 and higher.

Since changes and variations may be made in practicing this invention without departing from the spirit thereof as disclosed herein, it is intended to include, in the scope of the appended claims all such modifications in detail as will be apparent to those skilled in the art.

What is claimed is:

1. A thermoplastic sheet prepared from a blend of (1) polypropylene comprising at least 75% of linear, regular head-to-tail isotactic-crystalline macromolecules and (2) about 5% to 40% by weight of poly-1-butene comprising at least 75% of linear, regular head-to-tail isotactic-crystalline macromolecules, said sheet being thermo-resistant to temperatures ranging up to about 110° C., and having a high mechanical strength and an elastic modulus ranging from about 7,000 to 15,000 kg./cm.².

2. The thermoplastic sheet of claim 1 wherein said polypropylene and said poly-1-butene have a molecular weight within the range of between about 80,000 and 200,000.

References Cited

FOREIGN PATENTS 538,782  12/1955  Belgium.

SAMUEL H. BLECH, *Primary Examiner.*

MURRAY TILLMAN, *Examiner.*

T. G. FIELD, Jr., *Assistant Examiner.*

UNITED STATES PATENT OFFICE
CERTIFICATE OF CORRECTION

Patent No. 3,356,765  December 5, 1967

Pompilio Musso et al.

It is hereby certified that error appears in the above numbered patent requiring correction and that the said Letters Patent should read as corrected below.

Column 1, line 26, for "September 29, 1957" read -- September 25, 1957 --; column 4, line 46, for "include," read -- include --.

Signed and sealed this 18th day of February 1969.

SEAL)

Attest:

Edward M. Fletcher, Jr.
Attesting Officer

EDWARD J. BRENNER
Commissioner of Patents